United States Patent

[11] 3,628,857

[72] Inventor Donald M. Harvey
 Rochester, N.Y.
[21] Appl. No. 868,695
[22] Filed Oct. 23, 1969
[45] Patented Dec. 21, 1971
[73] Assignee Eastman Kodak Company
 Rochester, N.Y.

[54] FULLY AUTOMATIC FOCUSING PROJECTOR
 10 Claims, 6 Drawing Figs.
[52] U.S. Cl. .................................................. 353/101,
 250/204, 352/140, 353/69
[51] Int. Cl. ............................................... G01b 3/00,
 G01b 21/14
[50] Field of Search .......................................... 353/69,
 101; 352/140; 350/255; 250/204

[56] References Cited
 UNITED STATES PATENTS
 3,249,006  5/1966  Stauffer ........................ 352/140
 3,519,342  7/1970  Kaess .......................... 353/101

Primary Examiner—Leonard Forman
Assistant Examiner—Steven L. Stephan
Attorneys—Robert W. Hampton and Steve W. Gremban ABSTRACT: A projector having an optical ranging system for automatically optically sensing the screen-to-lens distance and in response thereto establishing the proper film-to-lens distance for placing a film image in focus. The projector further has an optical focusing system which may include parts of the optical ranging system for maintaining the established film-to-lens distance in the projector and the film image in focus. Initially, the optical ranging system is enabled to sense the screen-to-lens distance and in response thereto to establish the proper film-to-lens distance for proper focus while the optical focusing system is disabled. The positioning of a film in the projection position disables the optical ranging system and enables the optical focusing system to maintain the established film-to-lens distance. Additional zoom mechanism may be provided to automatically maintain an illuminated viewing area on the screen of a predetermined size regardless of the size of the film area being projected.

DONALD M. HARVEY
INVENTOR.

BY
ATTORNEYS

DONALD M. HARVEY
INVENTOR.

ATTORNEYS

DONALD M. HARVEY
INVENTOR.

FULLY AUTOMATIC FOCUSING PROJECTOR

BACKGROUND OF THE INVENTION

1. Field of the Invention

This invention relates generally to projectors, and more specifically to a fully automatic focusing projector for initially focusing the projector in response to optically sensing the screen-to-lens distance, and then maintaining the projected film image in focus.

2. Description of the Prior Art

Automatic focusing projectors having optical focusing means to sense the film position along the optical projection axis and to maintain an established distance between the film and the projection lens of the projector at which the film image is in focus are well known in the art. Any distortion or movement of the film along the optical projection axis from its focused position, due to creeping, buckling, or popping of the film resulting from heat produced by the projector illumination system or the like, is compensated for by adjusting the film-to-lens distance along the optical axis to the established distance to maintain film image focus on the screen. In such projectors, it is necessary to initially manually adjust the position of the projection lens along the optical axis to an established film-to-lens distance at which the projected film area is in focus on a screen for any preselected screen-to-lens distance. Such manual focusing of the projector is time consuming and a nuisance. Once the focused condition has been manually obtained for a particular screen-to-lens distance, the film image is automatically maintained in the focused condition by a focusing mechanism which automatically maintains the established film-to-lens distance.

SUMMARY OF THE INVENTION

This invention includes within its scope a fully automatic focusing projector having an optical ranging system for establishing a proper film-to-lens distance in response to an optically sensed screen-to-lens distance that will place the projected film image of a film positioned in the projection gate in focus on the screen. Operating in timed relation to the optical ranging system is an optical focusing system for maintaining the established film-to-lens distance and film image in focus even though the film should distort or move along the optical projection axis due to creeping, buckling, or popping of the film. Initially, the optical ranging system is enable and the optical focusing system disabled. In response to an action such as the positioning of a film in the projection position, the optical focusing system is enabled and the optical ranging system disable. Radiation sensing means is provided for selectively sensing the radiation from the ranging and focusing optical systems, and a drive means is provided responsive to the signal output of the sensing means for adjustably moving the projection lens or the film along the optic axis depending upon which optical system is enabled. The projection lens may further be provided with a reciprocally movable zoom lens for maintaining the illuminated viewing area on the screen of a predetermined size regardless of the size of the film area being projected. This is automatically accomplished by the zoom lens in response to movement of an indicator mechanism indicating a preselected film and screen size, and to movement of the projection lens focusing the slide image.

It is an object of the present invention to provide a fully automatic focusing projector that automatically optically senses the screen-to-lens distance and in response thereto establishes a proper film-to-lens distance for placing the projected film image in focus on the screen.

It is an object of the present invention to provide a fully automatic focusing projector having an optical ranging system for optically sensing the screen-to-lens distance and in response thereto establishing a proper film-to-lens distance for placing a projected film image in focus on the screen, and an optical focusing system operative in timed relation to the operation of the optical ranging system for automatically maintaining the established film-to-lens distance and the film image in focus even though film movement occurs due to creeping, buckling, or popping.

Another object of the invention is to provide a fully automatic focusing projector having a zoom lens mechanism operative to maintain the illuminated viewing area on the screen of a predetermined size for any preselected size of film area being projected.

The invention and its objects and advantages will become more apparent in the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

Because photographic projectors are well known, the present description will be directed in particular to elements forming part of or cooperating more directly with the present invention, projector elements not specifically shown or described herein being understood to be selectable from those known in the art.

Figure 1:
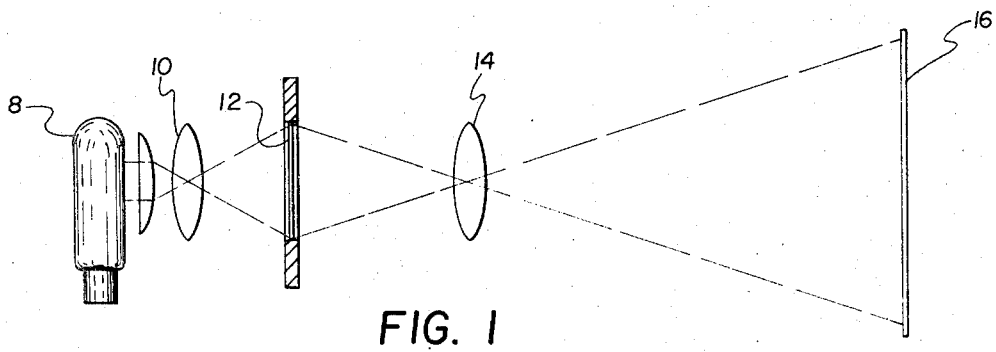
FIG. 1 is a schematic view of the projection system of a standard prior art projector showing the relationship between the screen-to-lens distances for proper focus.
Figure 2:
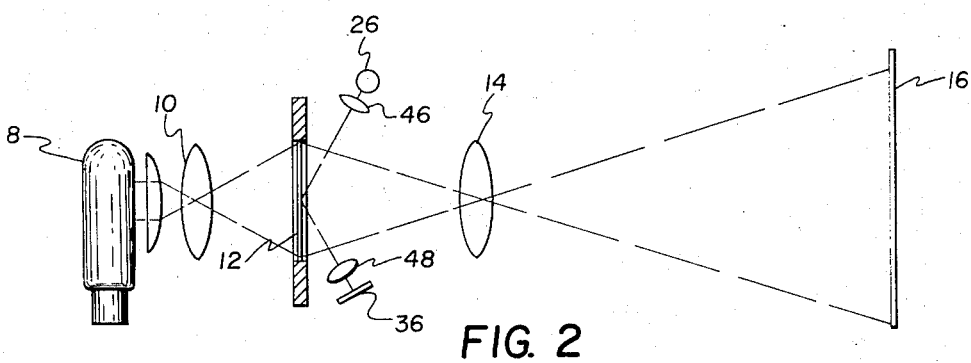
FIG. 2 is a view similar to FIG. 1 showing a standard prior art projector of the type disclosed in FIG. 1 equipped with an automatic focusing mechanism of known type.

A projector 7 incorporating a preferred embodiment of this invention utilizes the well known optical focusing system as shown in FIG. 2 in which light radiation from a radiation source 8 such as a lamp is collected by a condenser lens 10 and concentrated on a film 12 supported in a gate mechanism 13. The film 12 may be in the form of a transparency or slide amount, or a filmstrip such as is used in a motion picture projector. The film 12 is centered on an optic axis established by an objective lens 14 mounted in a lens barrel 15 for projecting an image of the film onto a screen 16.

The fully automatic focusing projector 7 of this invention essentially comprises an optical ranging system or means for optically sensing the screen-to-lens distance and in response thereto establishing a proper film-to-lens distance at which the projected film image at film gate 13 will be in focus on screen 16. It further comprises an optical focusing system or means for maintaining the film image in focus regardless of movement of the film along the optic axis due to creeping, buckling, popping or the like. The projector 7 is also provided with control means for enabling the optical ranging and focusing systems in timed relation, and drive means responsive to the enabled optical system for selectively moving a film gate housing 18 which supports film gate 13 or a projection lens housing 20 which supports lens barrel 15, both housings mounted for slidable movement on pins 22, 24, respectively. Both housings have a normal position in which they are held by any suitable mechanism, not shown, when none of the optical ranging or focusing systems are enabled.

Figure 3:
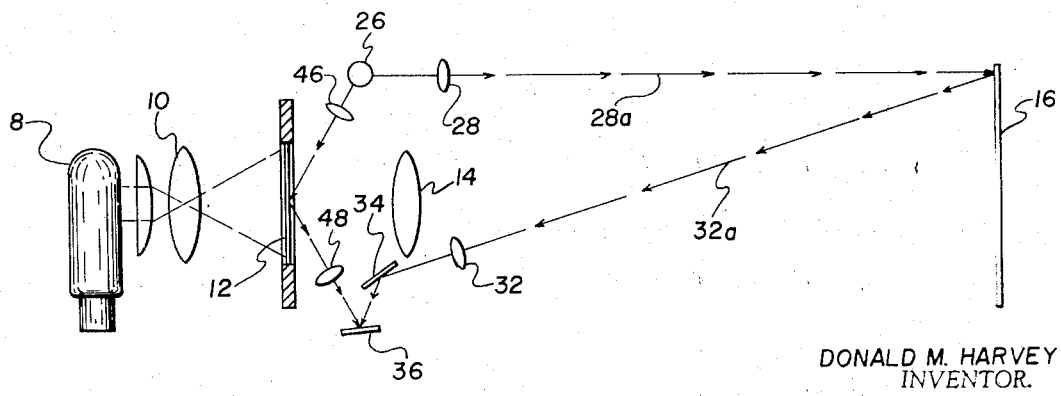
FIG. 3 is a view similar to FIG. 2 showing the fully automatic focusing projection system of this invention.
Figure 4:
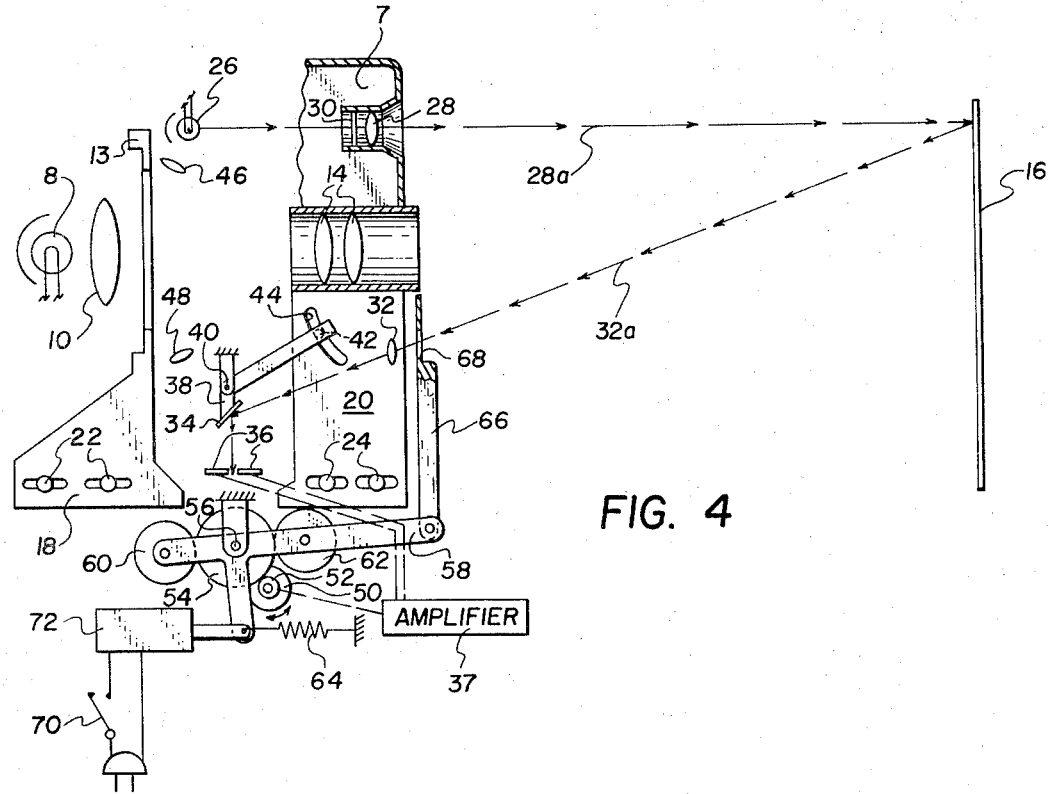
FIG. 4 is a side elevational view in diagrammatic form of a portion of a fully automatic focusing projector in which a preferred embodiment of the invention is embodied and showing the optical ranging system in an enabled position for optically sensing the screen-to-lens distance and in response thereto correctly setting the film-to-lens distance to place the film image in focus.

The optical ranging system or means for projector 7 as seen best in FIGS. 3 and 4 comprises any suitable focusing radiation source 26 shown as a separate incandescent lamp, although projection lamp 8 and suitably placed mirrors, not shown, may be used, and a focusing lens 28 carried by the frame of projector 7 for projecting the filament of lamp 26 onto screen 16 along an optical path designated 28a. An optical filter 30 is interposed between lamp 26 and focusing lens 28 to filter out the visible portion of the light spectrum. The invisible radiation is reflected from screen 16 and refocused by a receiving lens 32 along an optical path designated 32a onto a mirror 34 which deflects the image onto radiation sensing means in the form of closely spaced radiation sensitive cells 36 such as photoelectric cells, commonly referred to as photocells. The optical path 32a defines an angle that is a parameter of the effective screen-to-lens distance "d." The photocells 36 are electrically connected to an amplifier 37 and the amplified output thereof supplied to the drive means to be described hereinafter.

The amplifier 37 may be any suitable differential amplifying circuit of the type disclosed in copending U.S. Pat. application, Ser. No. 648,265, entitled "Focus Adjusting Circuitry for a Slide Projector" filed in the names of William E. Jordon and Franklin D. Kottler on June 23, 1967. The aforementioned photocells 36 may be photoresistive devices whose impedance varies with the amount of radiation impinging upon the cell. When the radiation is focused at a "null" point between the cells, the cells are equally irradiated and have approximately the same resistance so that the electrical voltage supplied to the input of the amplifier 37 is approximately zero. As the focused radiation shifts onto one of the cells, and away from the other cell, current will flow in one portion of the amplifier causing the motor to be driven in the proper direction to reposition the radiation at the "null" point between the photocells.

The mirror 34 for deflecting the radiation onto photocells 36 is secured to one end of an arm of a two armed lever 38 pivoted at 40. A cam follower 42 is provided on the other arm of lever 38 and cooperates with a cam 44 on lens housing 20 having a surface configuration designed to position mirror 34 so that the reflected radiation is focused at the "null" point between photocells 36 when the distance "d'" between the film and the objective lens is the proper or correct distance for focusing the projected film image onto screen 16 for any screen-to-lens distance "d" sensed by the first optical means. Accordingly, the cam configuration must be designed in accordance with the formula:

$d'$ (film-to-lens distance) $= f$ plus $f^2/d-f$ where

"$f$" is the focal length of the lens and "$d$" is the screen-to-lens distance.

Figure 5:
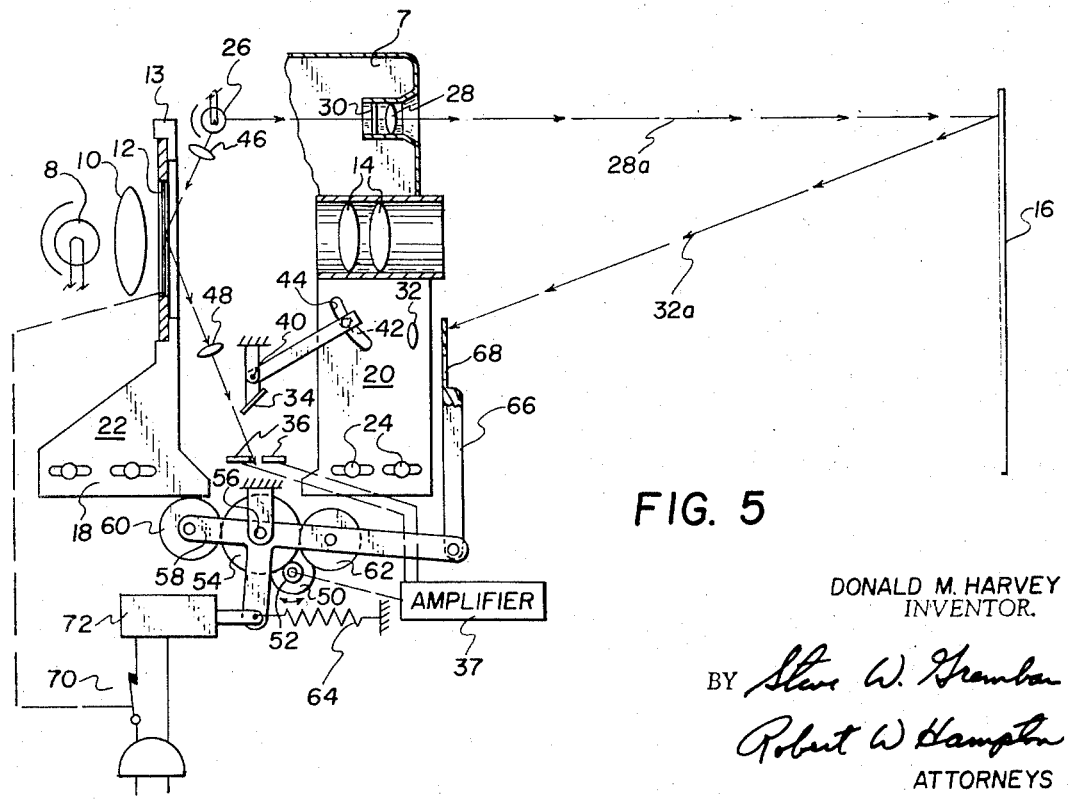
FIG. 5 is a view similar to FIG. 4 showing the optical focusing system in an enabled position for maintaining the projected film image in focus regardless of movement of the film.

The optical focusing means as seen best in FIG. 5 utilizes the same radiation lamp 26 and the same pair of photocells 36, although a separate radiation source and radiation sensing means may be used. A focusing lens 46 is provided for imaging or focusing the filament of lamp 26 on the surface of the film 12 supported by film gate 13, and a reimaging or refocusing lens 48 for focusing the reflected radiation from film 12 onto photocells 36. Since the photocells are connected to amplifier 37, as the radiation shifts onto one or the other of the cells, current will flow in the amplifier for actuating a drive means to move the film along the optic axis and reposition the focused radiation at the "null" point between the two photocells.

The drive means for moving the film gate housing 18 and projection lens housing 20 along the optic axis comprises a motor 50 connected to the output of amplifier 37 of the radiation sensing means for driving a drive roller 52 in either direction of rotation. The drive roller is in engagement with the periphery of a central roller 54 mounted for rotation on a shaft 56 about which a three-armed lever 58 is pivotally mounted. A pair of spaced drive rollers 60, 62 are rotatably mounted on lever 58 with their peripheries in driving engagement with central roller 54. A spring 64 connected to an arm on lever 58 normally urges the lever in a counterclockwise direction urging driver roller 62 into driving engagement with slidably movable projection lens housing 20. A lever 66 is pivotally connected to one end of lever 58 and is guided by any suitable means, not shown, for substantially reciprocal movement. The lever 66 has a shutter opening 68 adjacent its opposite end which is movable into the optic path or axis of the refocusing lens 32 when lever 58 is in its normal position as seen in FIG. 4, thereby enabling the optical ranging means. When a film 12 is positioned in film gate 13, a normally open switch 70 is closed energizing a solenoid 72 secured to an arm on lever 58 for pivotally moving the lever against the bias of spring 64 to its position, seen in FIG. 5, for disabling the optical ranging system by interposing the end of lever 66 in the optic path or axis of the refocusing lens 32, thereby blocking the travel of radiation along that optic path. Switch 70 may be actuated by the film itself, by a film carrier such as a film mount, or by mechanism responsive to the film or film carrier. When the film 12 is removed from film gate 13, switch 70 is opened, solenoid 72 deenergized and lever 58 moved by spring 64 to its normal position as seen in FIG. 4 for disabling the optical focusing means and enabling the optical ranging means by interposing shutter opening 68 in the optic path of refocusing lens 32.

Figure 6:
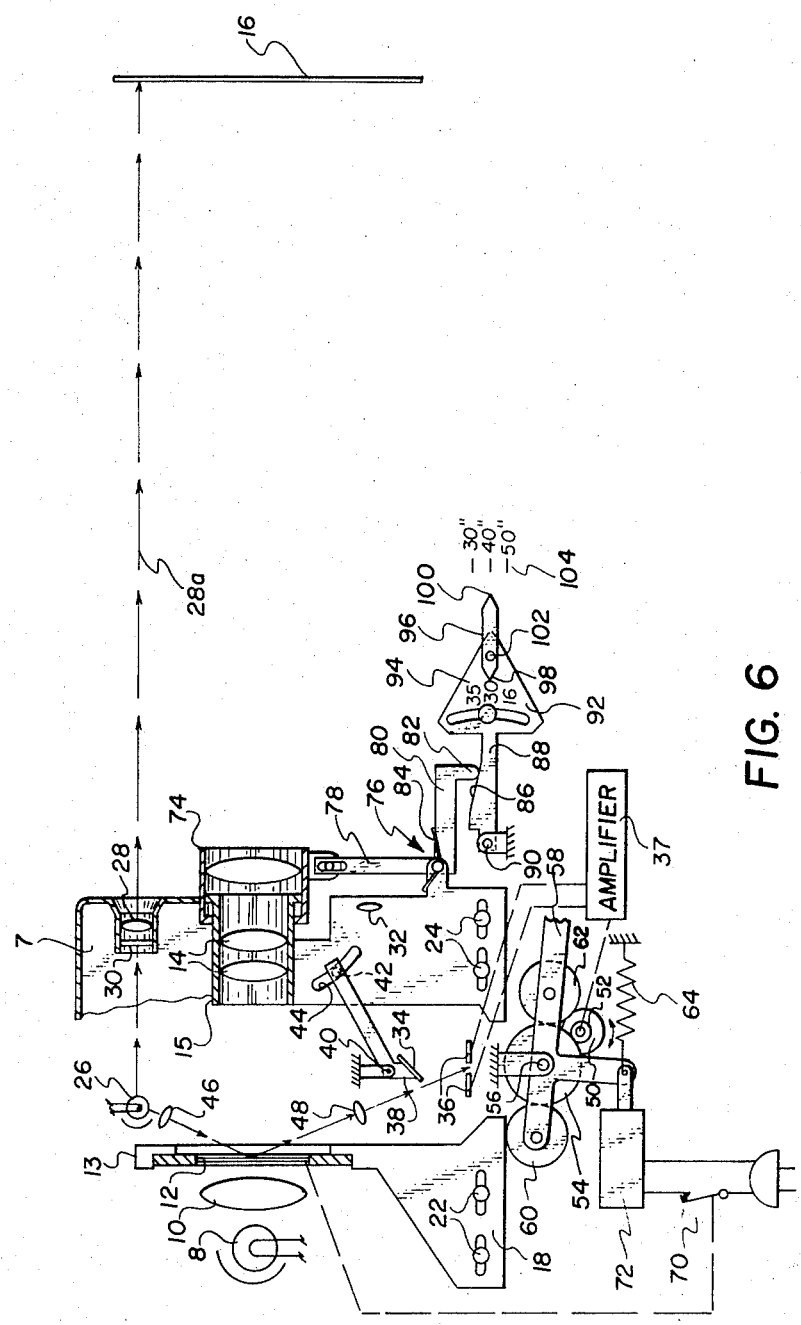
FIG. 6 is a view similar to FIG. 5 showing a zoom lens attachment for maintaining an illuminated viewing area on the screen of a predetermined size regardless of the size of the film area being projected.

The projector 7 is further provided with a zoom lens means for automatically maintaining the illuminated viewing area on the screen of a predetermined size regardless of the size of the projected film area. The zoom lens means as seen in FIG. 6 comprises an auxiliary zoom lens component 74 of any suitable type known in the art mounted for reciprocal movement relative to the projection lens 14 and lens barrel 15 for magnifying the projected film area without appreciably affecting the film image focus. The zoom lens component 74 is movable by a two armed lever 76 having one arm 78 pivotally connected to lens component 74 and its other arm 80 having a cam follower 82 urged by a spring 84 into engagement with a cam surface 86 on an indicator lever 88 pivoted at 90. The cam surface 86 is adjustable to take into account the size of the film to be projected and the size of the area to be illuminated on the screen. To accomplish this, an indicator plate 92 is provided at one end of indicator lever 88 having a film size indicia scale 94 for indicating any suitable film size such as 35 mm., 30 mm., 16 mm., etc. An arm 96 having pointers 98, 100 at the ends thereof is pivotally secured at 102 to indicator plate 92 and may be adjusted to move pointer 98 into register with the proper film size on indicia scale 92, where it is releasably retained by any suitable detent, not shown. The indicator lever 88, plate 92 and arm 96 are pivotally moved together as a unit around shaft 90 to align pointer 100 with indicia such as 30, 40 and 50 (representing inches) on a fixed scale 104, normally provided on the projector housing, not shown, indicating the desired size of the screen illuminated area. During operation of the optical ranging means, movement of the lens mount housing 20 along the optic axis by driver roller 62 automatically establishes the correct film-to-lens distance for an optically sensed screen-to-lens distance to place the projected film image in focus on the screen. In addition, by virtue of the adjustable cam surface 86 and cam follower 82 arrangement, the zoom lens component 74 is automatically moved to provide an illuminated viewing area on the screen of a predetermined size for a predetermined size of film being projected.

The invention has been described in detail with particular reference to a preferred embodiment thereof, but it will be understood that variations and modifications can be effected within the spirit and scope of the invention as described hereinabove.

I claim:

1. In a projector having a housing, an illuminated optical axis, means on the housing for supporting a film transparency in a predetermined reference plane along the optical axis for projecting an image of a supported film transparency onto a viewing surface in a plane spaced from the objective lens, and drive means for moving the objective lens along the optical axis; the improvement comprising:

means for sensing the distance between the objective lens and the viewing surface and for generating a signal indicative of such distance; and control means responsive to said signal for actuating the drive means to move the objective lens to a position along the optical axis to maintain the distance between the reference plane and the objective lens a predetermined function of the distance between the viewing surface and the objective lens, whereby the projected image is in focus at the viewing surface.

2. The improvement as defined in claim 1 wherein said sensing and signal generating means comprises:

a radiation source;

first optical means forming an image of said radiation source at the plane of the viewing surface, from which the image is reflected;

differential radiation-sensitive means for generating a signal indicative of the position of radiation impinging thereon; and second optical means for reimaging the reflected image upon said radiation-sensitive means at a position which is a function of the position of the objective lens along the optical axis and the distance between the viewing surface and the objective lens.

3. The improvement as defined in claim 2 wherein said first optical means includes filter means between said radiation source and said planar surface for removing the visible portion of the radiation.

4. In a projector having a housing, an illuminated optical axis, means on the housing for supporting a film transparency in a predetermined film plane along the optical axis, an objective lens having a focal length $f$ mounted on the housing a distance $d'$ from the film plane for movement along the optical axis for projecting an image of a supported film transparency onto a planar surface spaced a distance $d$ from the objective lens, and drive means for moving the objective lens along the optical axis; the improvement comprising:

means for sensing the distance $d$ and for generating a signal indicative of such distance; and control means responsive to said generated signal for activating the drive means to move the objective lens to a position wherein $d'$ equals $f+f^2/(d-f)$ 5. In a projector having a housing, an illuminated optical axis, means on the housing for supporting a film transparency for movement along the optical axis relative to a reference plane, an objective lens mounted on the housing for movement along the optical axis for projecting an image of a supported film transparency onto a viewing surface in a plane spaced from the objective lens, first drive means for moving a supported transparency relative to the reference plane, and second drive means for moving the objective lens along the optical axis; the improvement comprising:

means for sensing the distance between the objective lens and the viewing surface and for generating a signal indicative of such distance;

control means responsive to said signal for activating the second drive means to move the objective lens to a position along the optical axis to maintain the distance between the reference plane and the objective lens a predetermined function of the distance between the viewing surface and the objective lens;

means for detecting the position of a supported film transparency relative to the reference plane and for generating an error signal indicative of any difference between the position of the transparency and the reference plane; and means responsive to said error signal for activating the first drive means to move the transparency toward the reference plane.

6. The improvement as defined in claim 5 further comprising:

means for disabling said distance sensing and signal generating means when a film transparency is supported in the housing; and means for disabling said first drive means when a film transparency is not supported in the housing.

7. The improvement as defined in claim 5 wherein said sensing and signal generating means comprises:

a radiation source;

a first optical means for forming an image of said radiation source at the plane of the viewing surface, from which it is reflected by the viewing surface;

differential radiation-sensitive means for generating a signal indicative of the position of radiation impinging thereon; and second optical means for reimaging the reflected image upon said radiation-sensitive means at a position which is a function of the position of the objective lens along the optical axis and the distance between the viewing surface and the objective lens.

8. The improvement as defined in claim 7 wherein said position detecting and error signal generating means comprises:

third optical means for forming an image of said radiation source on a supported film transparency, from which the image is reflected; and fourth optical means for reimaging the image reflected from the transparency upon said radiation-sensitive means at a position which is a function of the supported film transparency relative to the reference plane.

9. In a projector having a housing, an illuminated optical axis, means on the housing for supporting a film transparency for movement along the optical axis relative to a reference plane, and an objective lens mounted on the housing for movement along the optical axis for projecting an image of a supported film transparency onto a viewing surface in a plane spaced from the objective lens, the improvement comprising:

a drive motor;

a transmission shiftable between a first condition interconnecting said drive motor and said objective lens and a second condition interconnecting said drive motor and said transparency supporting means;

means for selectively shifting said transmission between its first and second conditions;

means for sensing the distance between the objective lens and the viewing surface and for generating a signal indicative of such distance when said transmission is in its first condition for energizing said drive motor to move the objective lens to a position along the optical axis to maintain the distance between the objective lens and the reference plane a predetermined function of the distance between the objective lens and the viewing surface; and means for detecting the position of a supported film transparency relative to the reference plane and for generating an error signal indicative of any difference between the position of the transparency and the reference plane when said transmission is in its second position for energizing said drive motor to move the transparency toward the reference plane.

10. The improvement as defined in claim 9 wherein said transmission shifting means comprises:

means for shifting said transmission to its first condition when a film transparency is supported in said housing; and means for shifting said transmission to its first condition when a film transparency is not supported in said housing.

* * * * *